I. A. WEAVER.
VEHICLE WHEEL RIM ATTACHMENT.
APPLICATION FILED DEC. 26, 1917.
1,333,647.
Patented Mar. 16, 1920.
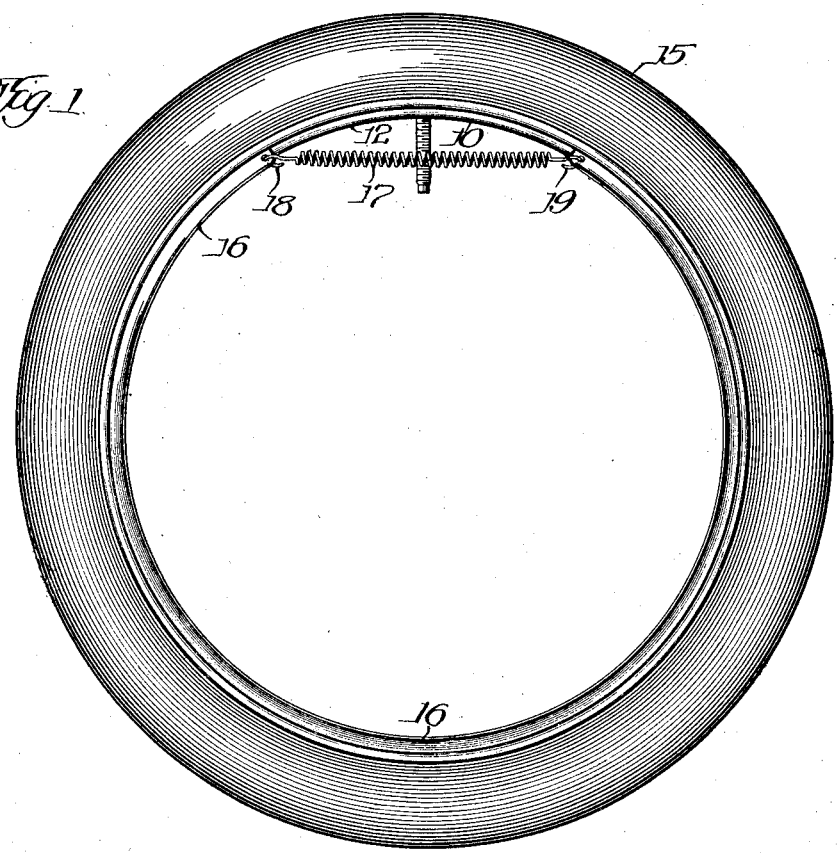
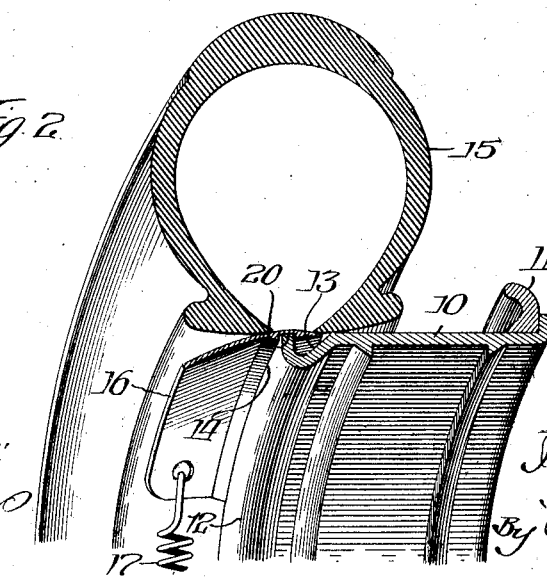

UNITED STATES PATENT OFFICE.

IRA A. WEAVER, OF SPRINGFIELD, ILLINOIS, ASSIGNOR TO THE WEAVER MANUFACTURING COMPANY, OF SPRINGFIELD, ILLINOIS, A CORPORATION OF ILLINOIS.

VEHICLE-WHEEL-RIM ATTACHMENT.

1,333,647.

Specification of Letters Patent.  Patented Mar. 16, 1920.

Application filed December 26, 1917. Serial No. 208,748.

*To all whom it may concern:*

Be it known that I, IRA A. WEAVER, a citizen of the United States, residing at Springfield, in the county of Sangamon and State of Illinois, have invented certain new and useful Improvements in Vehicle-Wheel-Rim Attachments, of which the following is a specification.

The removal of pneumatic tire casings from vehicle wheel rims, as well as their application to or mounting on such rims, is not unfrequently more or less arduous and difficult, but also sometimes results in injuring the casing. This is particularly true with respect to solid and other continuous or unsplit rims, including those having a groove near one edge designed and used for the accommodation of the well-known locking or retaining ring. During the removal of the casing sidewise from such a grooved rim, the bead portion of a clencher tire or the corresponding part of a straight-side tire, tends to enter or occupy such groove, and is likely to become injured in being drawn from it, or over it. The same objectionable and detrimental result is likely to occur when a tire-casing is being applied to or mounted on such a rim. These difficulties are furthermore augmented if the rim happens to be somewhat oversize or the tire-casing slightly undersize.

The main object of the present invention is, therefore, to provide an attachment or accessory appliance for a rim to facilitate and assist in the mounting of the tire-casing on or demounting it from the rim. A further purpose is to supply such a device as will be suitable and applicable for use with rims and tires of various sizes and shapes. And, in addition, a further salient feature of the invention is the designing of such an appliance which is simple in structure, readily and easily operated, efficient in accomplishing the desired results, and which can be constructed at small cost.

To permit those acquainted with this art to understand the structural and functional advantages of the improved device, I have illustrated a preferred and desirable embodiment of the same in the accompanying drawing forming a part of this specification and throughout the views of which like reference characters refer to the same parts.

In this drawing:

Figure 1 illustrates the attachment or accessory in side elevation applied to a rim equipped with its tire-casing, and Fig. 2 is a fragmentary view partially in perspective and partially in section illustrating on an enlarged scale the details of construction.

The vehicle wheel rim 10 is one of ordinary construction of the so-called "quick detachable" type, and has at one edge a retaining clencher ring or flange 11 which may be separate from or integral with the rim proper. In the present instance, it is shown as a separate element. Along the other edge of the rim the latter is deformed inwardly so as to provide an internal rib 12 presenting a groove 13 on the outer face of the rim for the reception of the customary locking-ring, the edge 14 of the rim being substantially in register with the main outer face of the rim. With rims of this type it is in part this groove which renders it hard to remove the tire casing, such as one of the clencher type 15 shown in the drawing.

Regardless, however, of whether the rim is supplied with such a groove or not, it is more or less difficult to apply a tire-casing laterally or sidewise to a rim whether of the solid or divided style, particularly if the rim happens to be somewhat oversize or the tire-casing is slightly undersize, and it is to facilitate and aid in removing the tire-casing from the rim or mounting it on the rim that the new appliance is designed.

Such appliance or accessory comprises a thin, more or less flexible, longitudinally-curved metal member 16 which extends only partially around the circumference of the rim, leaving a gap between its two ends, which are connected together by a coil contractile spring 17 whose terminal hooks 18 and 19 engage apertures in the end portions of the part 16. Thus, this comparatively-flexible member, whose ends are yieldingly connected together by the spring, is capable of a limited degree of expansion and contraction, which adapts it for employment with rims and tires of different sizes.

As is clearly shown in both figures of the drawing and on a larger scale in Fig. 2, such member 16 is externally, transversely convex, the portion thereof extending outwardly beyond the edge of the rim converging somewhat toward its axis, and to a lesser degree that portion of the member over the rim curves inwardly slightly and is of such a dimension as to practically cover or overlie the groove 13. Internally this expansible and contractible member has a longitudinal groove 20 adapted to receive and fit over the edge portion 14 of the rim, and, due to the two side walls or shoulders of such groove, the element 16 is prevented from unintentional lateral displacement with reference to the rim both when a tire-casing is being taken off or is being put on.

The appliance is operated practically as follows:

Assuming that it is desired to remove the casing 15 from the rim 10, the clencher-holding flange and coöperating locking-ring (not shown), are removed from one side of the rim in the usual way, the locking-ring being taken out of the retaining groove 13. Thereupon the appliance 16, 17, is expanded sufficiently to fit over the rim partially as shown in Fig. 2, the edge of the rim at one side of the groove 13 fitting in the groove 20, thereby holding the member properly in position, the contractible action of spring 17 holding the attachment firmly and snugly in place over the rim. It will be observed that the inner portion of this member closes the mouth of the groove 13, being curved slightly inwardly, and thus in drawing off or demounting the tire-casing it is impossible for its inner edge portion to become caught in the groove with danger of injury, and the same also applies to the flap within the casing. In thus withdrawing the casing the member 16 cannot be dislodged, being held firmly in position by reason of the presence of the groove 20. In thus demounting the casing that portion directly opposite the valve stem is first lifted or pulled off and then the remainder of the casing is removed in the proper direction, as is usual, to draw the valve-stem out through its aperture in the rim.

If it is desired to mount a casing on a rim of this type, using the improved appliance, the casing is partially placed over the rim with the valve stem through its hole and then the remainder of the casing is pushed sidewise over the rim, being guided into proper place by the flaring outer portion of the member 16, which guides it on to the rim and over the groove 13. In other words, this appliance acts somewhat on the principle of a shoe-horn. The casing having been positioned on the rim, the appliance is readily taken off without interference with the tire or any of its parts, whereupon the remaining elements of the rim may be put in place in the usual manner.

Whereas I have illustrated this device as particularly applicable for use with a rim of the type illustrated, it is to be understood that the invention is not limited and restricted to any particular use and may be advantageously employed with rims of various shapes and sizes. It is also to be understood that many minor mechanical changes may be incorporated in the appliance without departure from the substance and essence of the invention and without the sacrifice of any of its substantial benefits and advantages.

I claim:

1. An attachment for vehicle-wheel rims comprising an expansible and automatically contractible longitudinally-curved transversely-flared lengthwise-flexible single-piece member shorter than the circumference of a circle of its curvature in combination with a contractile spring connecting its ends together, said member having a portion constructed to temporarily fit over the circumferential groove of a tire rim to facilitate the application of tire casings thereto and their removal therefrom, substantially as described.

2. An attachment for vehicle-wheel rims comprising an expansible and automatically contractible longitudinally-curved lengthwise flexible single-piece member shorter than the circumference of a circle of its curvature in combination with a contractile spring connecting its ends together, said member having a portion constructed to temporarily fit over the circumferential groove of a tire rim to facilitate the application of tire casings thereto and their removal therefrom, said member also having internal means to coöperate with the rim to prevent lateral displacement of the member relatively thereto, substantially as described.

3. An attachment for vehicle-wheel rims comprising an expansible and automatically contractible longitudinally-curved lengthwise-flexible single-piece member shorter than the circumference of a circle of its curvature in combination with a contractile spring connecting its ends together, said member having a portion constructed to temporarily fit over the circumferential groove of a tire rim to facilitate the application of tire casings thereto and their removal therefrom, said member also having internally a lengthwise inwardly-facing groove to receive the edge of the rim whereby to prevent lateral displacement of the member relatively thereto, substantially as described.

4. An attachment for vehicle-wheel rims comprising an expansible and contractible longitudinally-curved transversely-flared lengthwise-flexible member shorter than the circumference of a circle of its curvature in combination with a contractile spring connecting its ends together, said member having internal means with oppositely-disposed shoulders to coöperate with the rim to prevent lateral displacement of the member relatively thereto, substantially as described.

5. A temporary attachment for vehicle-wheel rims to facilitate the application and removal of tire-casings including an expansible and contractible, longitudinally-curved, transversely-flared, lengthwise-flexible, single-piece member shorter than the circumference of a circle of its curvature having a portion adapted to temporarily fit over the circumferential groove of a tire-rim to assist in the application of tire-casings thereto and their removal therefrom, substantially as described.

6. A temporary attachment for vehicle-wheel rims to facilitate the application and removal of tire-casings comprising in combination an expansible and contractible longitudinally - curved, transversely - flared, lengthwise-flexible member shorter than the circumference of a circle of its curvature having a portion adapted to temporarily fit over the circumferential groove of a tire-rim to assist in the application of tire-casings thereto and their removal therefrom and means connecting the adjacent ends of said member together, said member having internal means to coöperate with the rim to prevent lateral displacement thereof on the rim, substantially as described.

IRA A. WEAVER.